(12) United States Patent
Fischer

(10) Patent No.: US 11,856,644 B2
(45) Date of Patent: Dec. 26, 2023

(54) WIRELESS DISCOVERY OF WIRELESS DEVICE USING ONE OR MORE DRONES

(71) Applicant: T-Mobile USA, Inc., Bellevue, WA (US)

(72) Inventor: Steve Fischer, Fort Collins, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/565,204

(22) Filed: Dec. 29, 2021

(65) Prior Publication Data

US 2022/0124476 A1   Apr. 21, 2022

Related U.S. Application Data

(63) Continuation of application No. 16/370,238, filed on Mar. 29, 2019, now Pat. No. 11,218,863.

(51) Int. Cl.
| | |
|---|---|
| *H04W 8/00* | (2009.01) |
| *H04W 64/00* | (2009.01) |
| *H04B 7/185* | (2006.01) |
| *B60P 3/11* | (2006.01) |
| *B64C 39/02* | (2023.01) |
| *H04W 84/04* | (2009.01) |

(Continued)

(52) U.S. Cl.
CPC ............ *H04W 8/005* (2013.01); *B60P 3/11* (2013.01); *B64C 39/022* (2013.01); *B64C 39/024* (2013.01); *H04B 7/18506* (2013.01); *H04W 64/003* (2013.01); *B64U 50/34* (2023.01); *B64U 2101/00* (2023.01); *B64U 2201/202* (2023.01); *H04W 84/005* (2013.01); *H04W 84/042* (2013.01)

(58) Field of Classification Search
CPC .. B60P 3/11; B64C 2201/066; B64C 2201/12; B64C 2201/127; B64C 2201/148; B64C 39/022; B64C 39/024; H04B 7/18506; H04W 64/003; H04W 8/005; H04W 84/005; H04W 84/042; H04W 88/02
See application file for complete search history.

(56) References Cited

U.S. PATENT DOCUMENTS

| 5,802,469 A * | 9/1998 | Nounin ................. | H04W 28/18 |
| | | | 455/445 |
| 6,421,546 B1 * | 7/2002 | Tsao ........................ | H04B 1/44 |
| | | | 455/343.1 |

(Continued)

*Primary Examiner* — Babar Sarwar
(74) *Attorney, Agent, or Firm* — Lee & Hayes, P.C.

(57) ABSTRACT

An unmanned aerial vehicle may include a flight system, a wireless communication system, a processor, and a power system having a battery and a battery charging port. The power system may be operable to power the flight system, the wireless communication system, and the processor. The processor may be configured to operate the flight system to fly the unmanned aerial vehicle from a ground position to an in-air position while the battery charging port is attached to an air-to-ground tether, trigger a release of the air-to-ground tether from the battery charging port after determining the unmanned aerial vehicle has reached the in-air position and the battery is charged, and operate the flight system to execute a flight pattern while operating the wireless communication system to search for a wireless communication device.

20 Claims, 9 Drawing Sheets

(51) Int. Cl.
   *H04W 84/00*    (2009.01)
   *B64U 50/34*    (2023.01)
   *B64U 101/00*   (2023.01)

(56) References Cited

U.S. PATENT DOCUMENTS

| | | | | |
|---|---|---|---|---|
| 8,504,120 B2* | 8/2013 | Zhang | | H04W 52/0258 |
| | | | | 455/418 |
| 9,826,415 B1* | 11/2017 | Byrne | | G08B 25/14 |
| 10,321,397 B2* | 6/2019 | Gandhi | | H04W 52/0235 |
| 2002/0028701 A1* | 3/2002 | Satoh | | H04W 52/0277 |
| | | | | 455/574 |
| 2005/0255879 A1* | 11/2005 | Shi | | H04W 60/06 |
| | | | | 455/552.1 |
| 2013/0084803 A1* | 4/2013 | Hall | | H04W 52/0277 |
| | | | | 455/41.1 |
| 2013/0122902 A1* | 5/2013 | Ren | | H04W 64/003 |
| | | | | 455/434 |
| 2014/0192692 A1* | 7/2014 | Stark | | H04B 1/406 |
| | | | | 370/311 |
| 2014/0287733 A1* | 9/2014 | Mach | | H04W 52/0258 |
| | | | | 455/418 |
| 2015/0131619 A1* | 5/2015 | Zhu | | H04W 36/0022 |
| | | | | 370/332 |
| 2015/0184639 A1* | 7/2015 | Goessling | | B64C 39/022 |
| | | | | 290/55 |
| 2015/0264687 A1* | 9/2015 | Singh | | H04W 72/0453 |
| | | | | 370/280 |
| 2015/0327297 A1* | 11/2015 | Nilsson | | H04W 72/54 |
| | | | | 370/336 |
| 2016/0167804 A1* | 6/2016 | Serrot Hauke | | B64C 39/024 |
| | | | | 701/2 |
| 2016/0219440 A1* | 7/2016 | Wang | | H04W 48/16 |
| 2016/0337871 A1* | 11/2016 | Wieneke | | H02S 20/32 |
| 2016/0340006 A1* | 11/2016 | Tang | | B64C 39/024 |
| 2016/0376031 A1* | 12/2016 | Michalski | | G08G 5/025 |
| | | | | 701/15 |
| 2017/0111102 A1* | 4/2017 | Fan | | H04W 4/023 |
| 2017/0223597 A1* | 8/2017 | Telang | | H04W 36/24 |
| 2017/0263132 A1* | 9/2017 | Butler | | G08G 5/0026 |
| 2017/0309088 A1* | 10/2017 | Arya | | G07C 5/008 |
| 2018/0139152 A1* | 5/2018 | Shaw | | H04W 84/18 |
| 2018/0229859 A1* | 8/2018 | Evans | | G05D 1/0027 |
| 2018/0279105 A1* | 9/2018 | Huber | | H04W 4/025 |
| 2019/0047695 A1* | 2/2019 | Boudville | | B60R 25/24 |
| 2019/0098433 A1* | 3/2019 | Shaw | | H04W 4/46 |
| 2019/0185158 A1* | 6/2019 | Blake | | H02J 7/35 |
| 2019/0227555 A1* | 7/2019 | Sun | | G08G 1/096716 |
| 2020/0033128 A1* | 1/2020 | Baratz | | G05D 1/0094 |
| 2020/0046156 A1* | 2/2020 | Holzer | | G05D 1/0016 |
| 2020/0207230 A1* | 7/2020 | Evans | | B60L 53/34 |
| 2020/0219408 A1* | 7/2020 | Han | | B64C 39/024 |
| 2020/0287759 A1* | 9/2020 | Van Nee | | H04L 27/2613 |
| 2020/0310466 A1* | 10/2020 | Fischer | | B64C 39/022 |
| 2020/0314627 A1* | 10/2020 | Fischer | | H04W 8/005 |

* cited by examiner

WIRELESS DISCOVERY OF WIRELESS DEVICE USING ONE OR MORE DRONES

CROSS-REFERENCE TO RELATED APPLICATION(S)

This application is a continuation patent application of U.S. patent application Ser. No. 16/370,238, filed Mar. 29, 2019 and titled "Wireless Discovery of Wireless Device Using One or More Drones," the disclosure of which is hereby incorporated herein by reference in its entirety.

FIELD

Embodiments described herein relate to systems and methods for locating lost or missing individuals, and more particularly to searching for signals from a user's electronic device with unmanned aerial vehicles.

BACKGROUND

Modern mobile devices such as mobile phones have myriad wireless communication capabilities. For example, mobile phones may be able to communicate via cellular protocols, WiFi protocols, and the like. Further, users of such mobile devices often carry those devices with them at all times, including when participating in outdoor activities and in locations where conventional land lines or other communications equipment is not widely available. Accordingly, mobile devices may provide essential communications and other capabilities to individuals in a variety of different environments and circumstances.

In parallel, unmanned aerial vehicle technology is becoming increasingly effective, safe, and affordable. Accordingly, unmanned aerial vehicles, such as small, multi-rotor vehicles sometimes referred to as "drones," are becoming available for various novel and beneficial uses.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

Described herein are unique systems and methods for using unmanned aerial vehicles (e.g., "drones") to search for and locate individuals who may be lost, missing, or otherwise in need of assistance. For example, mobile phones, which people often carry at all times, may be configured to operate in a beacon mode where certain programs or operations are suspended in order to increase battery life, and a beacon signal is periodically transmitted by an antenna of the phone. In conjunction, drones may be equipped with radios that can detect the beacon signal, determine the location of the phone, and capture images of the location in question. The drones may fly along a flight pattern in an area where the lost individual is likely to be in order to find the individual. Unique charging techniques may also be used to maximize the flight time of the drones, such as using releasable air-to-ground charging tethers.

An unmanned aerial vehicle may include a flight system, a wireless communication system, a processor, and a power system having a battery and a battery charging port. The power system may be operable to power the flight system, the wireless communication system, and the processor. The processor may be configured to operate the flight system to fly the unmanned aerial vehicle from a ground position to an in-air position while the battery charging port is attached to an air-to-ground tether, trigger a release of the air-to-ground tether from the battery charging port after determining the unmanned aerial vehicle has reached the in-air position and the battery is charged, and operate the flight system to execute a flight pattern while operating the wireless communication system to search for a wireless communication device.

The power system may be configured to receive power via the air-to-ground tether as the unmanned aerial vehicle moves from the ground position to the in-air position. The power system may be configured to power the flight system using energy stored in the battery to fly from the ground position to the in-air position, and the processor may be configured to at least partially recharge the battery via the air-to-ground tether before triggering the release of the air-to-ground tether.

The processor may be configured to search for the wireless communication device by operating the wireless communication system to wirelessly receive, from the wireless communication device, an identifier of the wireless communication device, determining that the identifier matches a saved identifier, and wirelessly receiving, from the wireless communication device, a location of the wireless communication device.

The unmanned aerial vehicle may further include a camera, and the processor may be configured to operate the flight system to fly the unmanned aerial vehicle to an in-air position proximate the location of the wireless communication device, and operate the camera to capture at least one image of the location of the wireless communication device.

Operating the wireless communication system to wirelessly receive the identifier of the wireless communication device may include operating the wireless communication system at a predetermined time and for a predetermined duration, and temporarily ceasing operation of the wireless communication system after the predetermined duration. The processor may be configured to operate the wireless communication system to request a data broadcast from the wireless communication device.

A wireless communication device may include a processor and a wireless communication system including a first radio and a second radio. The wireless communication device may also include a battery operable to power the wireless communication system and the processor. The processor may be configured to determine at least one of: that the wireless communication system has not detected a cellular base station for a predetermined period of time, or that the battery has dropped below a predetermined charge level, and after making the determination, cease operation of the first radio, operate the wireless communication system to transmit, with the second radio, a series of signals, each respective signal being transmitted for a respective predetermined duration at a respective predetermined time, and between transmissions of the signals, cease operation of the second radio. The first radio may communicate via a first frequency band, and the second radio may communicate via a second frequency band that does not overlap with the first frequency band.

The signals may include a signal set identifier (SSID). The signal may include a unique device identifier associated with the wireless communication device. The wireless communication device may further include a positioning system, and the signal may include a location of the wireless communication device as reported by the positioning system. The processor may be further configured to operate the wireless communication system to transmit, with the second radio and in response to a request from a remote unmanned aerial vehicle, a data broadcast.

A method for locating a device using an unmanned aerial vehicle may include, at an unmanned aerial vehicle and during a flight of the unmanned aerial vehicle, at a first predetermined time and at a first location, monitoring a radio spectrum for a wireless communication signal, in response to detecting the wireless communication signal, estimating a direction from the unmanned aerial vehicle to a source of the wireless communication signal, in response to not detecting the wireless communication signal, flying to a second location such that the unmanned aerial vehicle arrives at the second location at or before a second predetermined time, and at the second predetermined time and at the second location, monitoring the radio spectrum for the wireless communication signal. The wireless communication signal may be a signal set identifier (SSID). The method may further include launching the unmanned aerial vehicle from a mobile launch apparatus.

The method may further include determining a location of a cellular base station with which the device last communicated, moving the mobile launch apparatus to a launch location that is within a distance of the cellular base station, and after the mobile launch apparatus arrives at the launch location, launching the unmanned aerial vehicle. The distance may be about 50 miles or less.

The method may further include, after the mobile launch apparatus arrives at the launch location, launching one or more additional unmanned aerial vehicles, each additional unmanned aerial vehicle configured to monitor the radio spectrum at the first predetermined time.

The method may further include, after launching the unmanned aerial vehicle, recharging a battery of the unmanned aerial vehicle by supplying power to the unmanned aerial vehicle via an air-to-ground tether that is releasably coupled to the unmanned aerial vehicle, and after recharging the battery to a target level, releasing the air-to-ground tether from the unmanned aerial vehicle.

BRIEF DESCRIPTION OF THE DRAWINGS

The disclosure will be readily understood by the following detailed description in conjunction with the accompanying drawings, wherein like reference numerals designate like structural elements.

Figure 1:
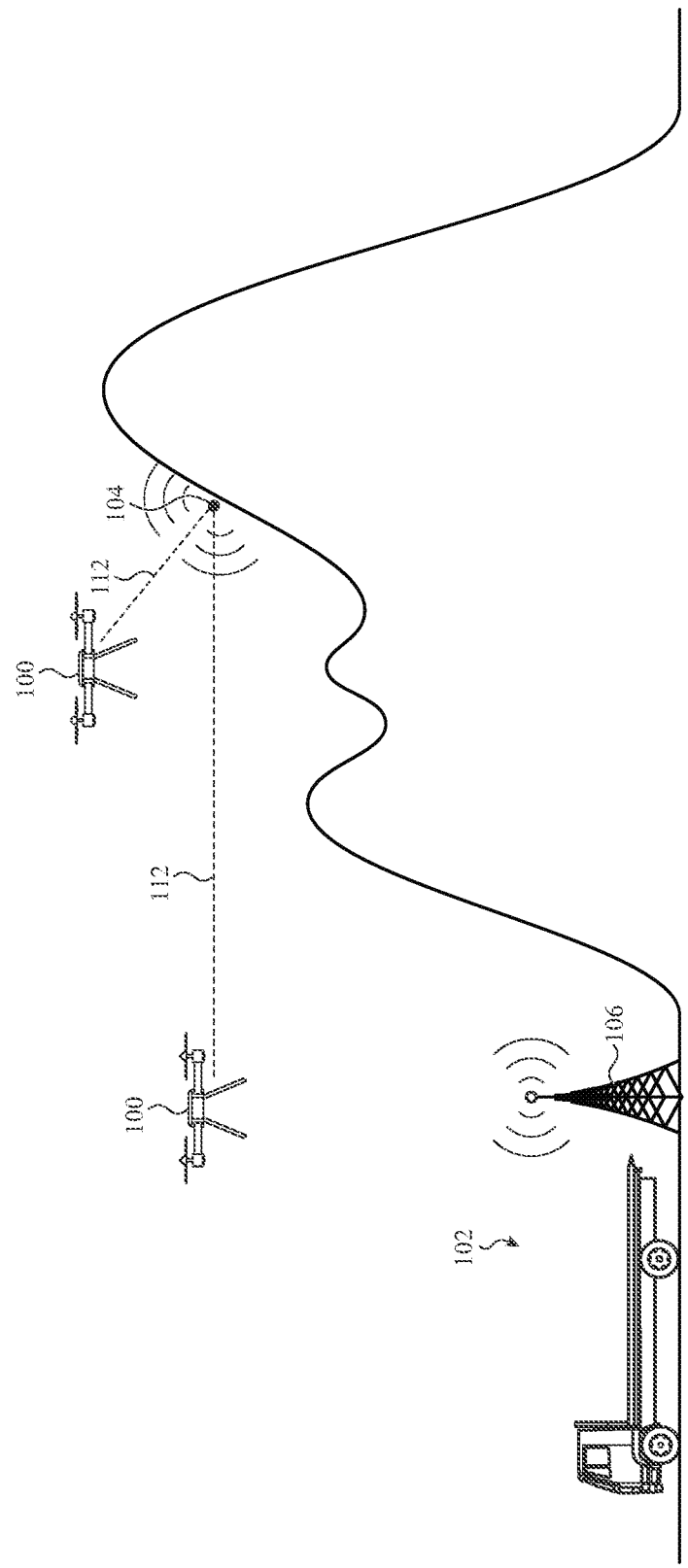
FIG. 1 illustrates an example scenario in which unmanned aerial vehicles (UAVs) are performing a search operation for a wireless communication device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Mobile phones have become increasingly ubiquitous in modern society. These devices provide a wide range of functions and uses. For example, in addition to providing voice telephone services, they may also provide text messaging services, global positioning system (GPS) capabilities, wireless data communications (e.g., WiFi), and media playback functions, among numerous others. Further, users often keep their mobile phones with them at all times, and as such are rarely if ever without access to wireless communications functions. In many cases, this allows individuals who find themselves in a predicament to seek assistance via their mobile phones. For example, a lost driver can easily access a map to see their location and also find a route to an intended destination. However, should a user find himself or herself in a location where wireless communications are unavailable, the mobile phone may be of limited use. For example, if a hiker loses his or her way or becomes injured in a remote location and cannot get cellular reception (e.g., a connection to a cellular base station), they may not be able to call or message for help despite having their mobile phone with them. Further, if a user's phone is constantly searching for a connection to a cellular base station, the device's battery may quickly become drained, rendering the mobile phone essentially useless for communications or localization functions. Accordingly, described herein are systems and techniques for using a mobile phone to help find users who are lost or missing or otherwise in need, and who may not have cellular voice or data connectivity via their mobile phone.

In particular, a mobile phone may be operable in a beacon mode in which, under certain conditions, the device ceases trying to communicate to a cellular base station (which may quickly drain the device's battery) and instead sends a periodic signal (e.g., via a WiFi radio) that may be detected by a nearby sensor and/or receiver. Because the user may be in a remote location and because WiFi signals from a mobile phone do not have an infinite range, mobile search vehicles may be deployed to search for and locate the beacon, thereby locating the user. Due to their mobility, versatility, size, range, and the like, the mobile search vehicles may include unmanned aerial vehicles (UAVs), such as multi-rotor UAVs, single-rotor helicopter-style UAVs, fixed wing UAVs, lighter-than-air UAVs (e.g., dirigibles, blimps, etc.), or any other suitable type of UAV. Such UAVs may include onboard wireless communications systems (e.g., antennas, radios, etc.) that search for beacon signals from mobile devices as described above. Once a beacon of a lost or missing person has been detected by the UAV, the UAV may determine a location of the user (or at least the user's device), capture images of an area where the user is believed to be, and relay that information to other rescuers who may physically travel to the lost or missing user and render aid.

Various techniques are employed by a mobile phone and a UAV to improve the likelihood of finding a user. For example, as noted above, when in a beacon mode, a mobile device may deactivate radios (and/or other circuitry, applications, or operations) that cause rapid battery drain (e.g., cellular radios), and instead send out periodic signals via a radio that consumes less power to operate (e.g., a WiFi radio). Further, the mobile phone may transmit the beacon at a predetermined time and for a predetermined duration, and the one or more UAVs that are searching for the user may only activate their radios during the predetermined time and for the predetermined duration. As one specific example, a beacon mode may be configured to transmit a signal for twenty seconds every twenty minutes, starting at the top of the hour (e.g., at 12:00, 12:20, 12:40, 1:00, 1:20, and so on). Further, beacon modes may operate identically across many instances of devices and UAVs, so that regardless of what user is in need of assistance, which communication device they are using, and which UAVs are searching for the user, the UAVs can always expect to find a beacon signal within the same time window. This may help to improve battery life of both the UAVs and the mobile phones, as neither device needs to operate its radio continuously.

Other techniques may also be employed to increase the effectiveness of the system. For example, the UAVs may be launched from a mobile launch apparatus that conveys the UAVs to a location near a last-known location of the user. Further, the mobile launch apparatus may include an air-to-ground tether that can recharge the batteries of the UAVs after the UAVs have been launched and have reached an in-air position. The UAVs may release their tethers once the batteries are at least partially recharged and/or reach a target charge value, so they can then freely fly along a path to seek out the user. Other techniques and features are described herein.

FIG. 1 illustrates an example scenario in which a fleet of UAVs 100 have been launched from a mobile launch apparatus 102 and are seeking a wireless communication device 104 that has been reported to be lost, missing, or otherwise in need of assistance. The scene illustrated in FIG. 1 is of a user lost in a mountainous region, and optionally where the user is out of range of a cellular base station 106. Of course, this particular scene is merely for example purposes, and the operations, devices, techniques, etc. described with respect to FIG. 1 apply equally or by analogy to other environments as well. For example, a UAV search operation may be used where a user is lost in a desert, at sea, in an urban environment, or the like.

As used herein, a wireless communication device 104 may be any suitable type of wireless communication device that includes wireless communication capabilities and/or communicates via wireless communication protocols, such as cellular communications, WiFi, Bluetooth, IEEE 802.11, or the like. It will be understood that the wireless communication device may be a mobile phone, a tablet computer, a smart watch, a media player, or the like. Further, where the instant discussion refers to a particular type of wireless communication device (e.g., a mobile phone), it will be understood that other types of devices may in some cases be substituted for the mobile phone. UAVs (e.g., the UAVs 100) are depicted in the instant figures as multi-rotor aircraft, though this is merely for illustration, and any of the aforementioned types of UAVs may be substituted for the depicted multi-rotor aircraft.

The wireless communication device 104 may be configured to operate in a beacon mode under certain circumstances, as described herein. A user may manually activate the beacon mode, or the beacon mode may be initiated by the device itself upon detection of certain conditions. For example, the device 104 may activate the beacon mode in response to determining that the device 104 is out of range of a cellular base station (e.g., for a predetermined period of time, such as 30 minutes, one hour, or the like), or that a cellular signal strength has dropped below a threshold value. Additionally or alternatively, the device 104 may activate the beacon mode in response to determining that the battery of the device 104 has dropped below a predetermined charge level (e.g., 50%, 40%, 30%, 20%, or any other suitable charge level).

When in the beacon mode, the wireless communication device 104 may turn off or limit the operation of certain radios, antennas, applications, and/or other functions, in order to preserve the battery life of the wireless communication device 104 while in the beacon mode. For example, the wireless communication device 104 may cease operating one or more cellular radios (which may communicate via a first frequency band, such as between about 800 MHz and about 2500 MHz). Additionally, in the beacon mode the wireless communication device 104 may send a wireless signal via a WiFi communications protocol (e.g., an IEEE 802.11 based protocol, which may be a second frequency band that does not overlap with the first frequency band, such as between about 2 GHz and about 5 GHz). The beacon may correspond to a broadcast of a signal set identifier (SSID), which is detectable by the wireless communication system of the UAV. The SSID may include information about the wireless communication device, such as a unique identifier of the device, a location of the device (e.g., geographic coordinates from a GPS system associated with the device), a health status of the user (which may be selected by the user), a name or identity of the user, or the like. In some cases, while the wireless communication device 104 is in the beacon mode, it periodically acquires a current location from a GPS system associated with the device, and updates the SSID to include the most recent GPS coordinates. When in the beacon mode, the device 104 may operate the GPS system less frequently as compared to a normal operating mode, so as to further reduce the battery usage and thereby extend the operational time of the beacon mode.

While the foregoing example describes the beacon signal as an SSID, any suitable signal may be transmitted by the wireless communication device when it is operating in a beacon mode. The content of the signal may include any of the information described above, including an identifier of the wireless communication device, a name of the user, a periodically updated GPS location, etc.

FIG. 1 illustrates a scenario in which the wireless communication device 104 has been determined to be or reported lost or missing and, in response, the UAVs 100 have been launched from the mobile launch apparatus 102. As shown in FIG. 1, the mobile launch apparatus 102 is depicted as a truck, though it may be any other suitable mobile launch apparatus such as a trailer, car, boat, or other powered or otherwise movable vehicle or apparatus. The UAVs 100 are shown mid-flight, optionally after a recharging operation has taken place via an air-to-ground tether between the UAVs and the mobile launch apparatus 102. The UAVs 100 may be flying along a flight pattern and periodically activating its wireless communication system to monitor a radio spectrum to determine if they can detect a signal from the wireless communication device 104 (as indicated by dotted lines 112). The UAVs 100 may monitor a radio spectrum corresponding to the spectrum of the beacon signal from the wireless communication device 104. Upon detecting the signal from the wireless communication device 104 by a UAV 100, that UAV may perform one or more operations. For example, the UAV 100 may determine or estimate a location of the wireless communication device 104, capture images of an area where the signal was detected (optionally after travelling to a location that is estimated to be above the signal source), alert other UAVs and/or a base station that the signal has been detected (and optionally inform them of the location of the source, the identity of the source, etc.), or the like.

The UAVs 100 may have been launched from a mobile launch apparatus 102, which may have travelled to a search area after a person had been reported or otherwise determined to be missing or in need of help. Once the user is reported or determined to be missing or in need of help, an estimate of the user's last known location may be determined. For example, a location of a cellular base station 106 with which the device last communicated may be determined. More particularly, a search operation coordinator (which may be associated with or may communicate with a wireless voice and data service provider) may be provided with an identifier of the wireless communication device 104, and may determine which cellular base station 106 was most recently in communication with the wireless communication device 104. Once the particular wireless base station is identified, a search area or region may be determined based at least in part on one or more properties of or associated with the cellular base station 106 and the wireless communication device 104. For example, a search radius or area around the location of the cellular base station 106 may be based at least in part on the power of the cellular base station 106, a communication range of the cellular base station 106, a last known direction to the wireless communication device 104 from the cellular base station 106, or the like.

Once the last cellular base station 106 having been in communication with the wireless communication device 104 is identified, the mobile launch apparatus may be moved to a launch location that is within a particular distance of the cellular base station 106. For example, the mobile launch apparatus 102 may be moved to within a predetermined distance (e.g., 1 mile, 10 miles, 50 miles) of the cellular base station 106, or it may be moved to any location that is within a particular area surrounding the base station, where the size and shape of the area (and the particular location within the area) may depend at least in part on the particular base station, the terrain around the base station, the availability of roads or other traversable terrain near the base station, etc. In other cases, the mobile launch apparatus 102 may be moved to a location that is proximate (e.g., as close as is practicable given the terrain, roads, etc.) to a maximum effective range of the cellular base station 106, and optionally along a path that is between the cellular base station 106 and the last known location of the wireless communication device 104 (e.g., along a straight line path extending from the cellular base station 106 to the last known or estimated position/location of the wireless communication device 104). The location of or direction to the last known location of the wireless communication device 104 may be determined using radio direction finding techniques. In this way, the mobile launch apparatus 102 may be positioned closer to the current location of the wireless communication device 104 than would be achieved if the mobile launch apparatus 102 were located directly at the cellular base station 106. Stated differently, because the wireless communication device 104 is known or believed to be out of range of the cellular base station 106, placing the mobile launch apparatus 102 further away from the base station 106 will likely result in the mobile launch apparatus 102 being closer to the wireless communication device that is being sought.

Once the mobile launch apparatus 102 is positioned at the target location, the UAVs 100 may be launched, optionally recharged after reaching an in-air position, and sent along a flight pattern to search for the signal from the wireless communication device 104. The distance of the mobile launch apparatus 102 to the cellular base station 106 may be any suitable distance, such as about 1, 10, 20, 50, or 100 miles, though other distances are also contemplated.

Figure 2A:
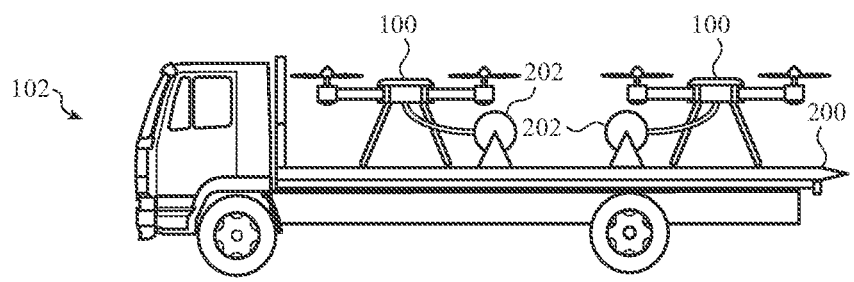
FIGS. 2A-2C illustrate stages of an example UAV launching operation.
Figure 2B:
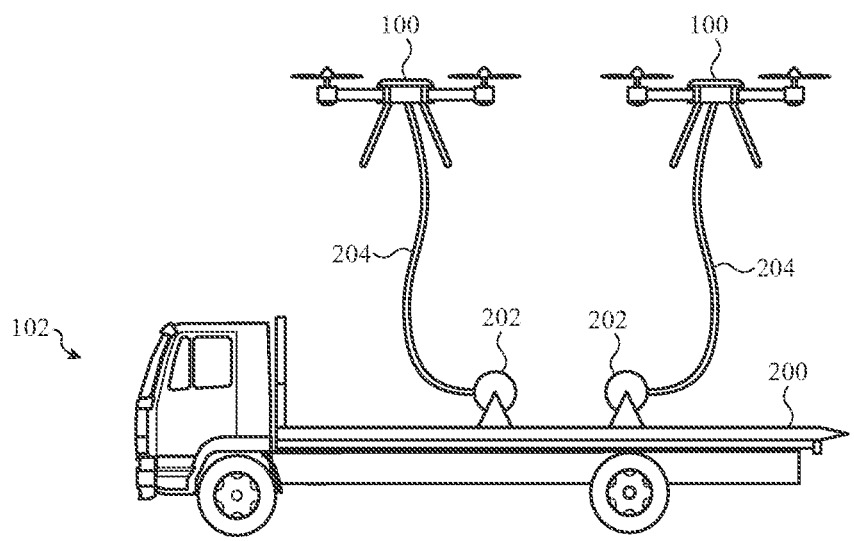
Figure 2C:
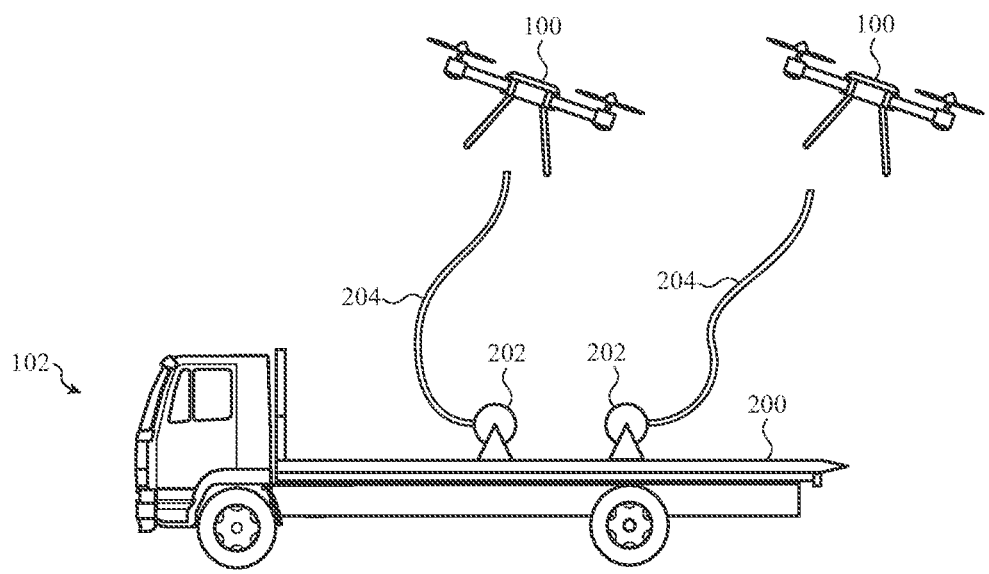

FIGS. 2A-2C illustrate the mobile launch apparatus 102 at various stages of an operation for launching and recharging UAVs 100. FIG. 2A shows two UAVs 100 (though more or fewer UAVs may be included) on a launch platform 200 of the mobile launch apparatus 102. As shown the launch platform 200 is a bed of a truck, though it may take other forms as well (e.g., a bed of a trailer, a roof of a vehicle, a deck of a boat, the ground, a fixed launch pad or location, etc.).

Each UAV 100 may include a flight system, a communication system, a processor, and a power system having a battery and a battery charging port. The battery charging port of a UAV 100 may be attached to an air-to-ground tether 204 (FIG. 2B), which is configured to provide power to the battery of the UAV 100, and may be released or decoupled from the UAV 100 to facilitate untethered flight of the UAV 100.

When the mobile launch apparatus 102 is at a launch location, the UAVs may be launched to begin a search operation. In particular, all or a subset of the UAVs 100 may be commanded to fly from a ground position (e.g., on the launch platform 200) to an in-air position while the battery charging ports of the UAVs 100 are releasably coupled to their respective air-to-ground tethers 204. FIG. 2B illustrates the mobile launch apparatus 102 and UAVs 100 after the UAVs 100 have reached their in-air positions. In some cases, the in-air positions may correspond to a target altitude (e.g., above sea level or above ground) for a flight pattern for a search operation, and the UAVs 100 may attempt to maintain this altitude to avoid unnecessary or undesirable power loss resulting from additional altitude changes. In other cases, the target altitude of a flight pattern may differ from the in-air position of the UAVs 100 during tethered charging.

When a UAV 100 is at or moving to the in-air position, power may be provided to the UAV 100 through the air-to-ground tether 204. The power provided through an air-to-ground tether 204 may be used to recharge the onboard batteries of the attached UAV 100 during or after the travel to the in-air position. For example, a UAV 100 may use energy stored in its batteries when flying to the in-air position. After (and/or while) the UAV 100 flies to the in-air position, power may be provided through the air-to-ground tether 204 to recharge the batteries of the UAV 100, thereby ensuring that the UAV 100 will have its maximum range available to it for a search operation. In some cases, a UAV 100 may supply power from the air-to-ground tether 204 directly to the motors of the UAV 100 (and optionally all electrical components of the UAV 100) so that energy from the batteries is not used during the take-off operation.

After a UAV 100 has reached its in-air position and the batteries of the UAV 100 have reached or are at a target charge level (e.g., 100% charged, 90% charged, or any other suitable charge level), the UAV 100 or the mobile launch apparatus 102 may trigger a release of the air-to-ground tether 204 from the battery charging port of the UAV 100. In cases where the UAV 100 uses only power from the air-to-ground tether 204 to reach the in-air position, the air-to-ground tether 204 may be released as soon as the target in-air position is reached, without regard to the charge level of the battery. Triggering the release of the air-to-ground tether 204 may include causing a mechanism to mechanically unlatch or otherwise detach the air-to-ground tether 204 from the UAV 100, and optionally forcefully eject or propel the air-to-ground tether 204 away from the battery charging port and/or the UAV 100 (e.g., towards the ground). FIG. 2C illustrates the UAVs 100 after having released the air-to-ground tethers 204. After the air-to-ground tethers 204 have been released, the UAVs 100 may operate their flight systems to execute a flight pattern while operating their onboard wireless communication systems to search for a wireless communication device, as described herein.

The air-to-ground tethers 204 may be attached to take-up mechanisms 202 (e.g., spools) that allow the air-to-ground tethers 204 to be paid out as the UAVs 100 ascend to their in-air position. Once the air-to-ground tethers 204 are detached from the UAVs 100 (e.g., after the UAVs 100 have ascended to their in-air positions and optionally recharged to a target level), the take-up mechanisms 202 may retract the air-to-ground tethers 204.

The air-to-ground tethers 204 may be coupled to a base power source that provides the electrical power for the UAVs 100. For example, the air-to-ground tethers 204 may be coupled to batteries, a generator (e.g., a gas or diesel powered generator), solar panels, a utility-level power source, or the like. The base power source may include power controllers and/or power conditioning components that provide the proper power to the UAVs 100 and control aspects of the charging and power supply operations.

As described above, once a UAV 100 has been launched and has been optionally recharged using an air-to-ground tether, it may execute a flight pattern to search for a wireless communication device. The flight pattern may be selected so that the UAV is located at particular areas at particular times to increase the chances that the UAV will be within range of the wireless communication device at a time when the wireless communication device is transmitting a beacon signal. In particular, the flight pattern may be based at least in part on an estimated transmission range of the wireless communication device and the transmission time and transmission interval of the beacon. For example, if a wireless communication device is estimated to have a transmission range of one mile (e.g., defining a circle with a one mile radius), and transmits a beacon for 20 seconds at 20 minute intervals (starting at the top of each hour), a UAV should not travel more than about two miles between two of the 20 minute intervals because the UAV could potentially overshoot the location of the wireless communication device and miss a beacon.

Figure 3A:
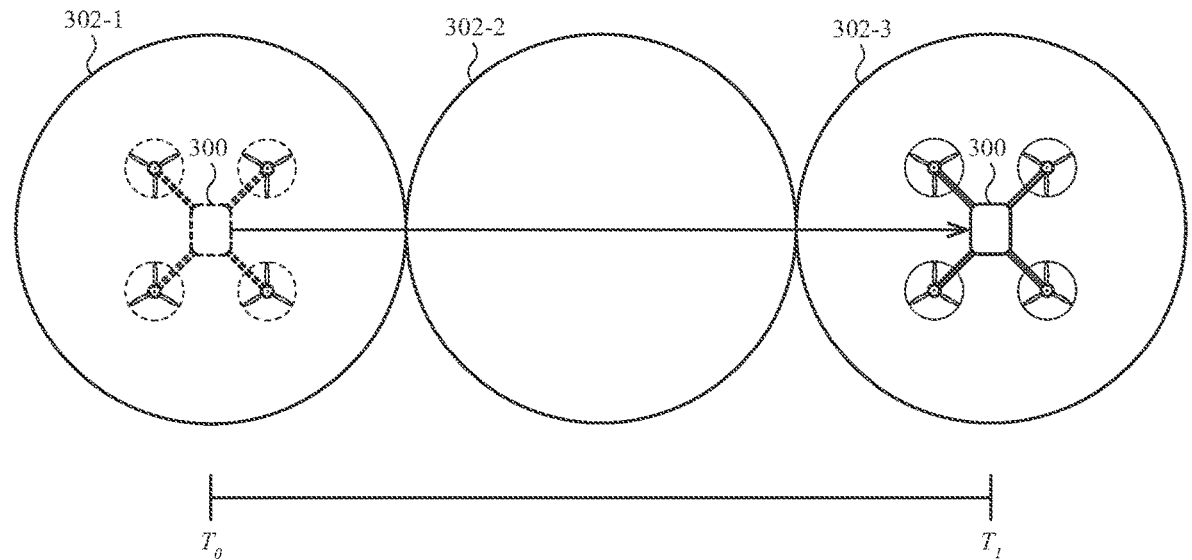
FIGS. 3A-3B illustrate example flight patterns of a UAV when searching for a signal from a wireless communication device.

FIG. 3A illustrates an example of a UAV travelling too far between beacon times (e.g., the predetermined times at which the wireless communication device is configured to emit a beacon signal). In particular, a UAV 300 (which may be an embodiment of a UAV 100) is within an area 302-1 at time $T_0$. The area 302-1 may correspond to an estimated range of transmission of a beacon transmitted by the wireless communication device, and $T_0$ may correspond to the predetermined time at which the wireless communication device is configured to emit the beacon signal. (The areas 302-1, 302-2, and 302-3 may each correspond to the estimated range of transmission of the wireless communication device.) If the UAV 300 overshoots the area 302-2 and is within the area 302-3 at time $T_1$, the UAV 300 could miss a transmission from a wireless communication device within the area 302-2. Stated differently, if the wireless communication device were actually in the area 302-2, the UAV 300 would likely not detect the beacon at time $T_0$ (because it is in the area 302-1 and out of range of the area 302-2) and would also not detect the beacon at time $T_0$ (because it is in the area 302-3 and is out of range of the area 302-2).

Figure 3B:
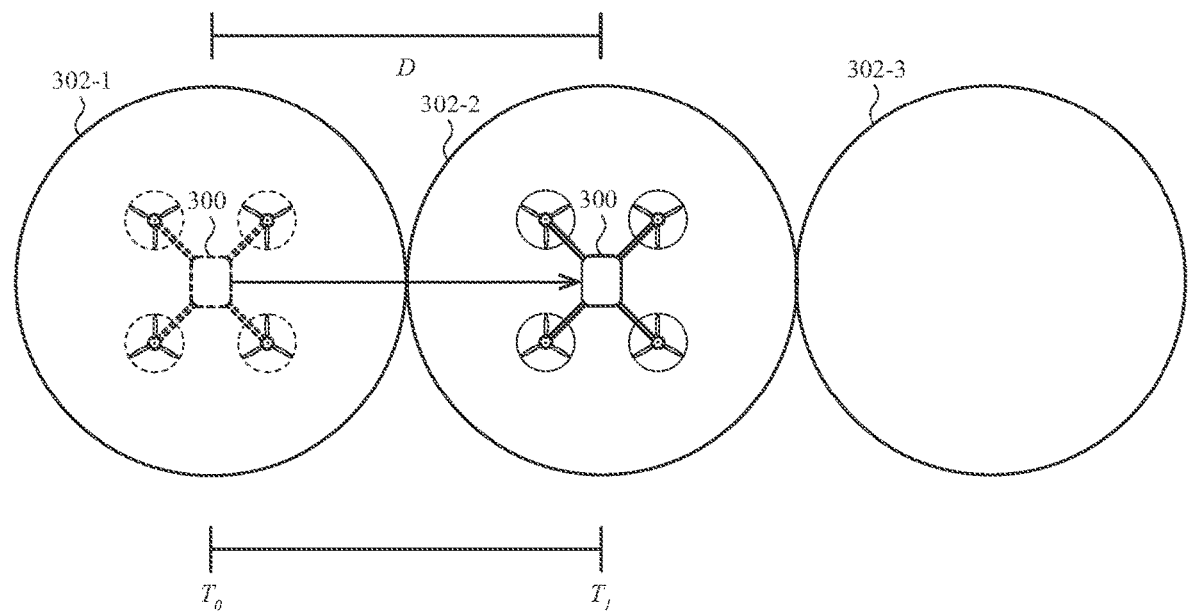

FIG. 3B illustrates an example of a flight pattern in which the maximum travel distance of the UAV 300 between two adjacent beacon times is restricted to a maximum distance D, based at least in part on the estimated transmission range of the wireless communication device in question. In particular, the UAV 300 is within the area 302-1 at time $T_0$. The UAV 300 may fly along a path that results in the UAV 300 being a distance D (and optionally no greater than a distance D) away from its initial position at time $T_1$, thus placing the UAV 300 in area 302-2 during the time when the wireless communication device is emitting the instance of the beacon at $T_1$. The UAV 300 may continue according to this scheme so that it does not fly out of range of a potential beacon location at a time when a beacon may be transmitted.

The transmission range (and thus the areas 302 and the maximum distance D) may be based on various factors. For example, parameters and specifications of the wireless device in question may be used when calculating or determining the transmission range, such as a frequency band (or bands) in which the beacon is being transmitted by that device, an antenna type or output power associated with the device, or the like (which may be known, for example, based on a cellular base station having information about the device as a result of the last communication between the cellular base station and the device). Other factors may also be considered, such as the terrain in which the user is located, weather conditions, the sensitivity of the wireless communication system of the UAV, and the like. Safety factors or other scaling factors may also be applied (e.g., the distance D may be established as 80% of a calculated or theoretical range, or any other suitable fraction of the calculated or theoretical range).

Figure 4A:
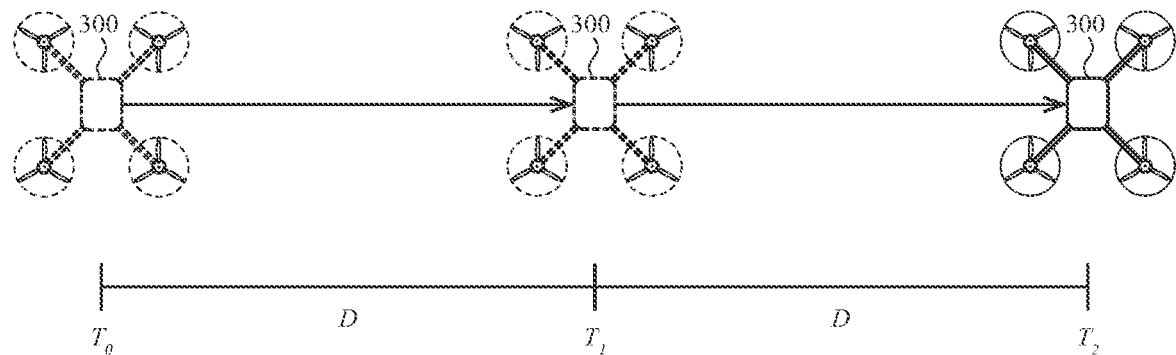
FIGS. 4A-4B illustrate additional example flight patterns of a UAV when searching for a signal from a wireless communication device.
Figure 4B:
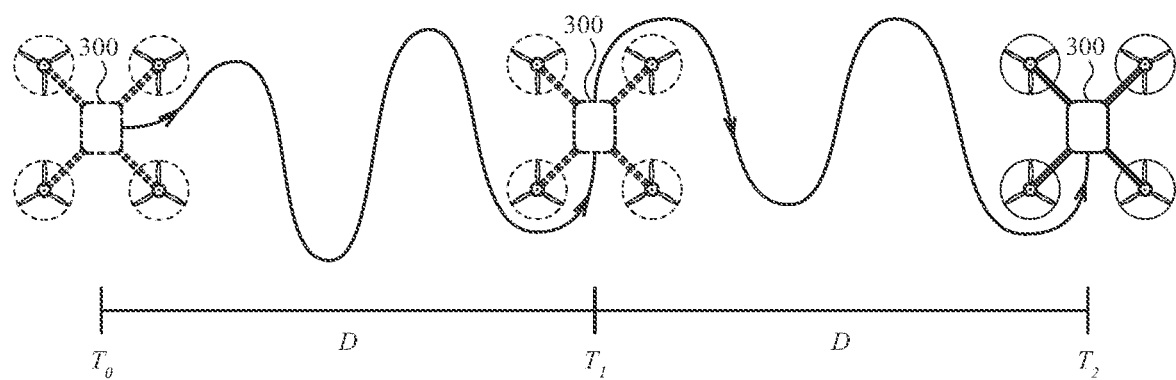

While FIGS. 3A-3B illustrate linear flight patterns, this is merely one example flight pattern, and the principles described above may apply equally or by analogy to other flight patterns as well. FIGS. 4A-4B illustrate example flight patterns of the UAV 300, in which the UAV 300 is positioned no further than the distance D from its location at the previous beacon time. FIG. 4A illustrates a linear path, similar to those described with respect to FIGS. 3A-3B. In particular, the UAV 300 may travel at a speed (e.g., $D/|T_1-T_0|$) that will result in the UAV 300 arriving at the second listening location at or nearly at the time $T_1$, and arriving at the third listening location at the time $T_2$. FIG. 4B illustrates an example flight pattern in which the UAV 300 travels a nonlinear path between adjacent listening locations, while still ending up, at $T_0$, no more than a distance D from the listening location associated with $T_1$ (and similarly, arriving, at $T_2$, a third listening location no greater than a distance D away from the second listening location).

In some cases, the UAV 300 does not actively search for the wireless communication device between listening locations. This may help preserve battery power and allow the UAV to search a greater area. In other cases, the UAV 300 may actively search for the wireless communication device between listening locations. For example, the UAV 300 may operate its wireless communication system to wirelessly receive beacon signals (if they are being transmitted) continuously during its flight. This may increase the chances of detecting a beacon from a device that is emitting beacons off schedule (e.g., due to a clock error of the wireless communication device).

Because the wireless communication device is configured to emit its beacon at a predetermined time and for a predetermined duration, the UAV 300 may likewise operate its wireless communication system at the same predetermined time and for the same predetermined duration (plus an optional additional time buffer). The time at which the wireless communication system is operated may correspond to or be associated with the listening locations described above. In some cases, when the predetermined time has passed (e.g., when no beacon is expected to be produced), the UAV 300 may temporarily cease operation of its wireless communication system at least until the next predetermined time (e.g., when the next beacon is expected). This may help preserve the batteries of the UAV 300, which may increase its maximum flight range and thus increase the likelihood of finding the lost or missing individual.

Figure 5A:
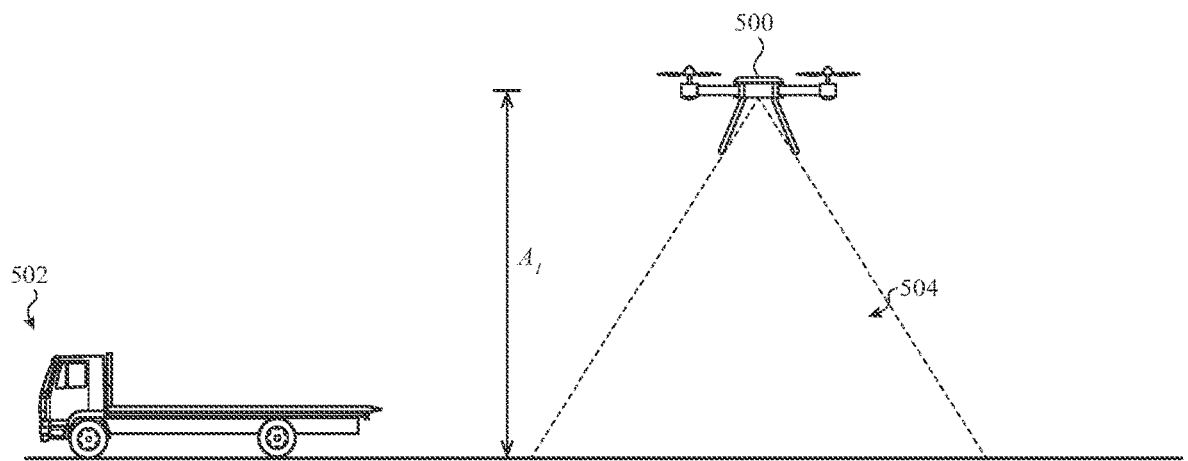
FIGS. 5A-5B illustrate example flight altitudes for a UAV based on different terrains.
Figure 5B:
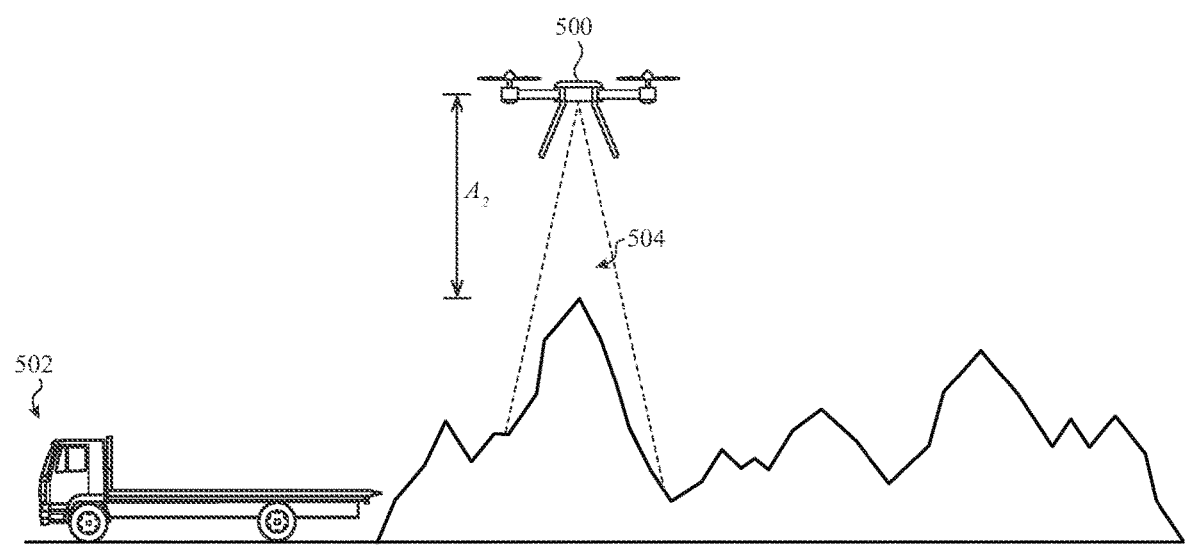

The altitude at which a UAV flies during a search operation may be determined at least in part by the terrain over which the UAV is flying. For example, FIG. 5A illustrates an example in which a UAV 500 (which may be an embodiment of the UAV 100) is launched from a mobile launch apparatus 502 (which may be an embodiment of the mobile launch apparatus 102) to fly a search operation over a substantially featureless terrain (e.g., a desert, field, body of water). In such cases, the UAV 500 may fly at an altitude $A_1$, which may be higher than an altitude that would be used if the UAV 500 were traversing a mountainous, hilly, or other irregular terrain (as shown in FIG. 5B). Flying at the higher altitude may allow the wireless communication system of the UAV 500 to have a greater effective range, as illustrated by the scanning area 504 in FIG. 5A.

In contrast, FIG. 5B shows the UAV flying a search operation over a mountainous terrain. In this case, the mountains (or other geologic structures, foliage, etc.) may result in reduced effective communication ranges for the UAV 500 and a wireless communication device that the UAV 500 is searching for. Accordingly, the UAV 500 may fly at a lower altitude $A_2$ (as compared to $A_1$). The particular target altitude for a particular drone and/or a particular search operation may be determined in any suitable way, and may depend on factors such as an average ground feature size across a search area. For example, if the average ground feature size across a search area is 1000 feet or above (e.g., a search area with mountains of an average height of 1000 feet), the target altitude above the ground may be 100 feet, whereas if the average ground feature size is 10 feet, the target altitude above the ground may be 300 feet. The UAV 500 may attempt to maintain a constant altitude above ground (e.g., it may follow the undulations of the terrain), or it may attempt to maintain a constant altitude above sea level or another reference altitude (e.g., it may not change its altitude in response to changes in the terrain).

During a search operation, such as those described above, a UAV may use its wireless communication system to attempt to detect the beacon from a wireless communication device. As described herein, the beacon may correspond to a WiFi network (e.g., an IEEE 802.11 based network). More particularly, the beacon may correspond to a broadcast of a signal set identifier (SSID), which is detectable by the wireless communication system of the UAV. The SSID may include information about the wireless communication device, such as an identifier of the device, a location of the device (e.g., geographic coordinates from a GPS system associated with the device), a health status of the user (which may be selected by the user), or the like.

When a UAV receives or detects the SSID, it may extract information from the SSID, such as the identifier of the device. The UAV may then determine if the received identifier matches a saved identifier to confirm that the detected wireless communication device does, in fact, correspond to the device that the UAV is searching for. If the UAV determines that the received identifier does match the saved identifier, it may take further steps to aid in the search operation. For example, the UAV may alert other UAVs (and optionally a base station or search operation coordinator) that the signal has been detected. The UAV may also provide to the UAVs or search operation coordinator its own location as well as any location information from the wireless communication device itself (e.g., the geographic coordinates extracted from the SSID). As another example, the UAV may capture images (video or still images) and optionally wirelessly send the images back to a UAV operator or other individual or computer for storage and/or analysis.

The UAV may also communicate with the wireless communication device to cause the wireless communication device to perform certain additional operations. For example, the UAV may request that the wireless communication device transmit a data broadcast that is different from the beacon. For example, the UAV may make a request that causes the wireless communication device to transmit a large amount of data (such as a file, a pseudorandom noise signal, etc.) on multiple channels, frequencies, spectral bands, or the like. The signal corresponding to this data broadcast may be more detectable by UAVs (e.g., detectable at a greater distance), and as such may help other nearby UAVs to corroborate the location of the wireless communication device. However, it may use a relatively larger amount of battery power to emit such a signal, and therefore may be reserved until at least one UAV has detected the lower-power beacon signal and requested that the wireless communication device emit the data broadcast.

In some cases, the beacon from a wireless communication device may not include the location of the wireless communication device, or it may be desirable for the UAVs to attempt to independently determine the location of the wireless communication device, as the wireless communication device may have been moved since its last GPS fix. UAVs may determine or estimate the location of a wireless communication device in various manners, examples of which are shown and described with respect to FIGS. 6A-6B.

Figure 6A:
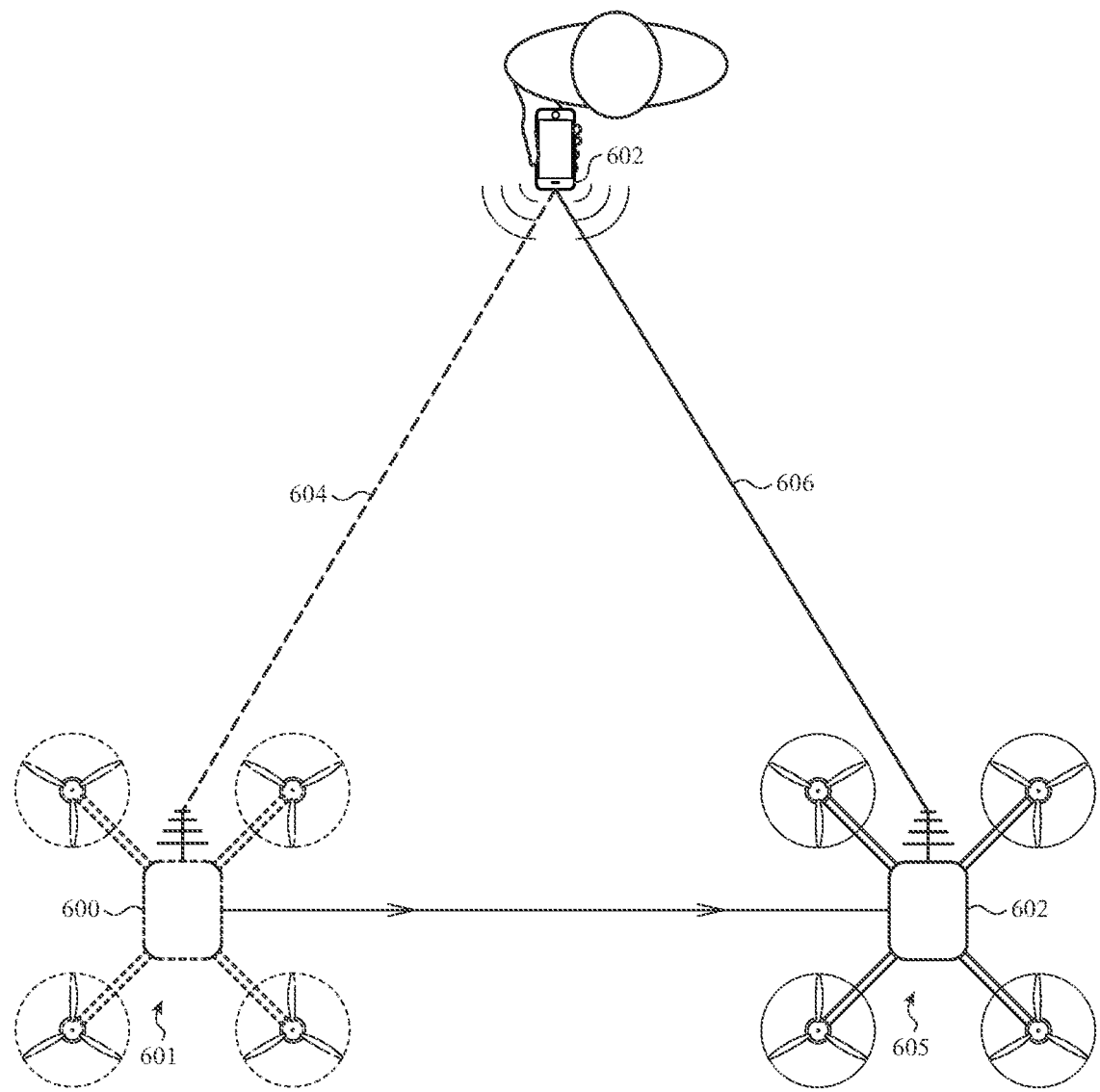
FIGS. 6A-6B illustrate example operations for estimating a location of a wireless communication device.

FIG. 6A illustrates how a single UAV may determine the location of a wireless communication device. In this instance, a UAV 600 (which may be an embodiment of the UAV 100) may detect a signal from a wireless communication device 602. When the UAV 600 is at a first location 601, it may use one or more radio direction finding techniques to determine a direction from the UAV 600 to the wireless communication device 602 (e.g., line 604). After the UAV 600 determines the direction from its first location 601 to the wireless communication device 602, the UAV 600 may move to a second location 605. The second location 605 may be a predetermined distance (e.g., 100 yards, 500 yards, or the like) along a predetermined direction (e.g., East, West), or it may be an arbitrary distance, or it may be determined using other factors or considerations. Once the UAV 600 is at the second location, it may use one or more radio direction finding techniques to determine a direction from the second location 605 to the wireless communication device 602 (e.g., line 606). The UAV 600 may access or record its own location (e.g., from an onboard GPS system) when it is determining the direction to the wireless communication device 602. Accordingly, the UAV 600 (or another device associated with the UAV 600) can use the first and second locations of the UAV 600 and the first and second directions to the wireless communication device 602 to triangulate the location of the wireless communication device 602. Once the location of the wireless communication device 602 has been determined, the UAV 600 may inform other UAVs, a base station, a search operation coordinator, or the like, of the location of the wireless communication device 602.

Figure 6B:
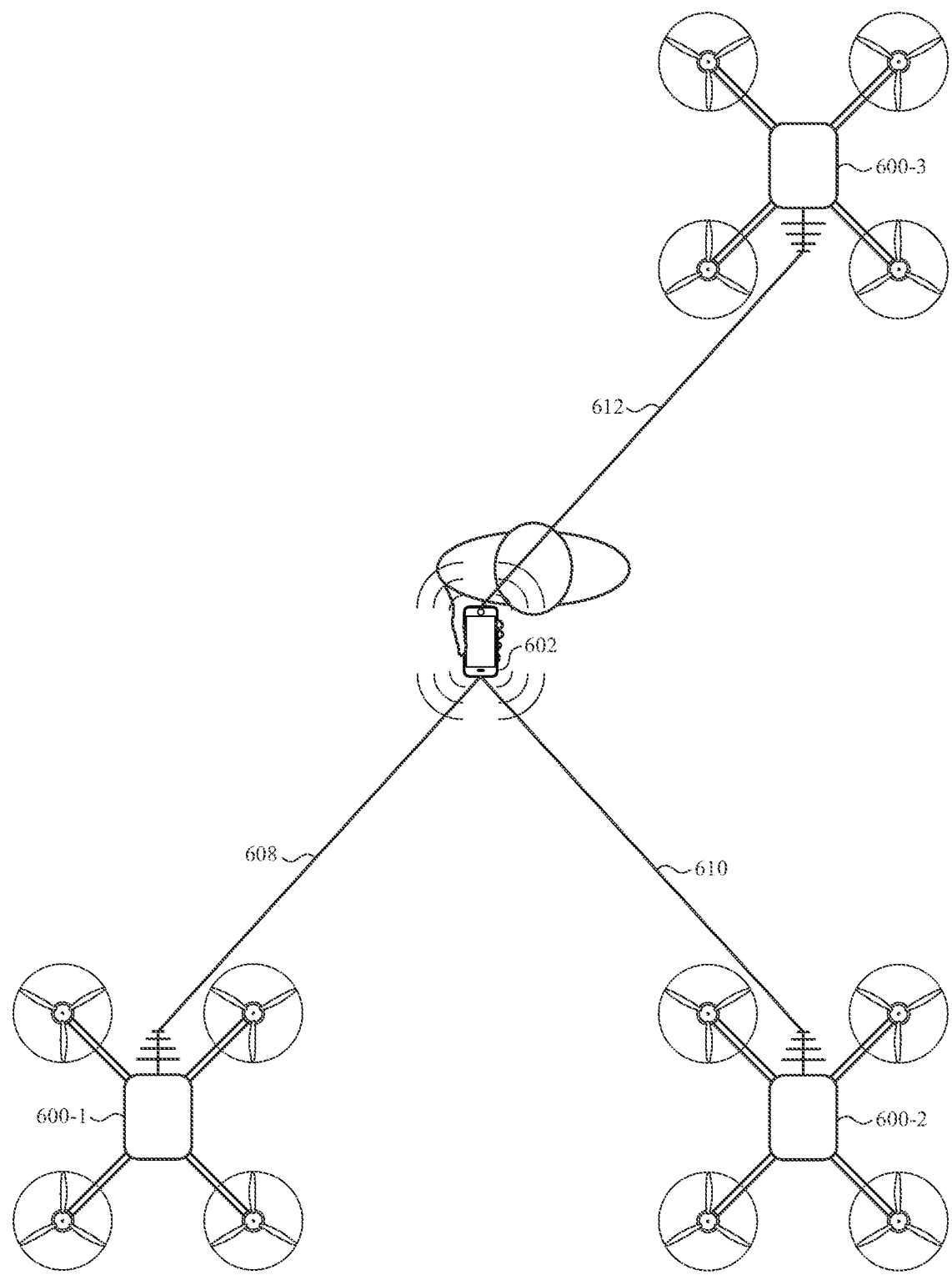

FIG. 6B illustrates how multiple UAVs may be used to determine the location of the wireless communication device 602. In this case, instead of a single UAV 600, multiple UAVs each independently determine their respective directions to the wireless communication device 602. For example, as shown in FIG. 6B, three UAVs (UAV 600-1, 600-2, and 600-3) each determine a direction from their respective locations to the wireless communication device 602 (e.g., indicated by lines 608, 610, 612). These directions along with the locations of each of the UAVs may be shared with each other, with a master or primary UAV (e.g., the UAV 600-1), and/or a base station or other search operation coordinator, which may then in turn use the locations of the UAVs and the directions to the wireless communication device 602 to triangulate the location of the wireless communication device 602.

After the location of a wireless communication device (e.g., the wireless communication device 602) is determined or estimated, one or more UAVs may fly to an in-air position that is proximate the location of the wireless communication device, and once at the in-air position, capture at least one image of the location of the wireless communication device. The one or more images may be still or video images. Further, the image may capture visible light (with or without external light sources such as flashes, spotlights, or the like), or infrared light (with or without external infrared light sources). Images captured by the UAVs may be transmitted wirelessly to other UAVs, a base station, a search operation coordinator, or the like, to assist in physically locating the lost or missing user. In some cases, the images are associated with location information, such as a location of the UAV when the image was captured, the estimated location of the wireless communication device, the identifier of the wireless communication device, or the like.

Figure 7:
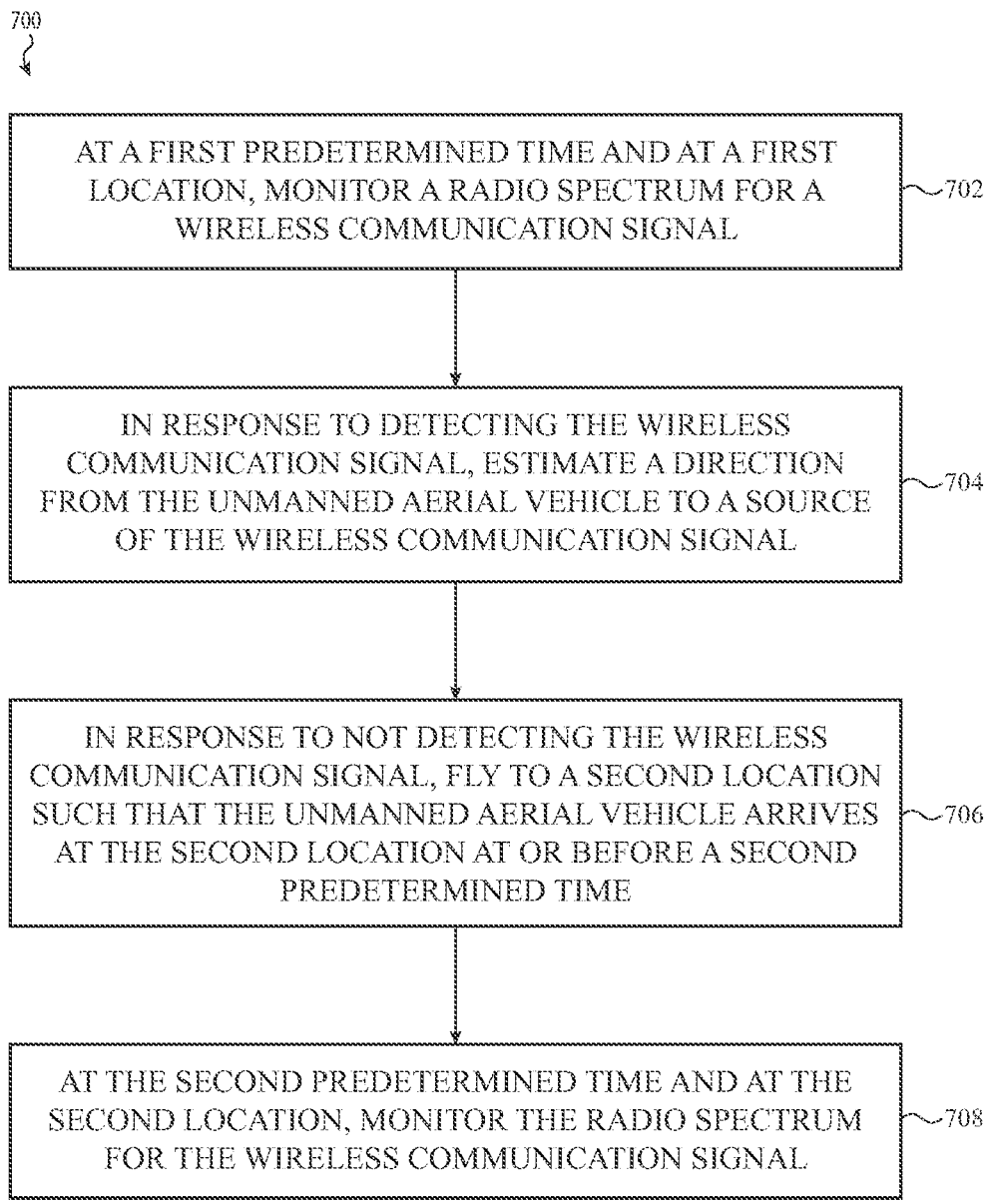
FIG. 7 is a flow chart of an example method for locating a wireless communication device with a UAV.

FIG. 7 is a flow chart of an example method 700 for locating a wireless communication device using a UAV. At operation 702, while a UAV is executing a flight pattern such as that described with respect to FIGS. 4A-4B, the UAV may monitor a radio spectrum for a wireless communication signal (e.g., a beacon from a wireless communication device) when the UAV is at a first predetermined time (e.g., Time $T_0$ in FIG. 4A or 4B) and when the UAV is at a first location. The radio spectrum may correspond to the radio spectrum on which the beacon is transmitted.

At operation 704, in response to detecting the wireless communication signal, the UAV may estimate a direction from the UAV to a source of the wireless communication signal. For example, the UAV may use radio direction finding techniques to estimate a direction to the source of the signal.

At operation 706, in response to not detecting the wireless communication signal at the first location and at the first predetermined time, the UAV may fly to a second location such that the unmanned aerial vehicle arrives at the second location at or before a second predetermined time (e.g., time $T_1$ in FIG. 4A or 4B). At operation 708, once the UAV is at the second location, and at the second predetermined time, the UAV may once again monitor the radio spectrum for the wireless communication signal. In response to detecting the wireless communication signal at the second location and at the second predetermined time, the UAV may estimate a direction from the UAV to the source of the wireless communication signal, as described above.

In any instance when a UAV detects the wireless communication signal, the UAV may perform additional operations, such as communicating with the wireless communication device to provide information to the wireless communication device (e.g., acknowledging that the user has been found, providing instructions to stay in one place or to move to another location, supplying a map or other physical directions, providing an estimated rescue time, or the like). The UAV may also travel to and capture images of an estimated location of the source of the wireless communication signal. The UAV may also send information to other UAVs and/or a base station or search operation coordinator, such as the location of the user, images captured of the location of the user, and the like.

Figure 8:
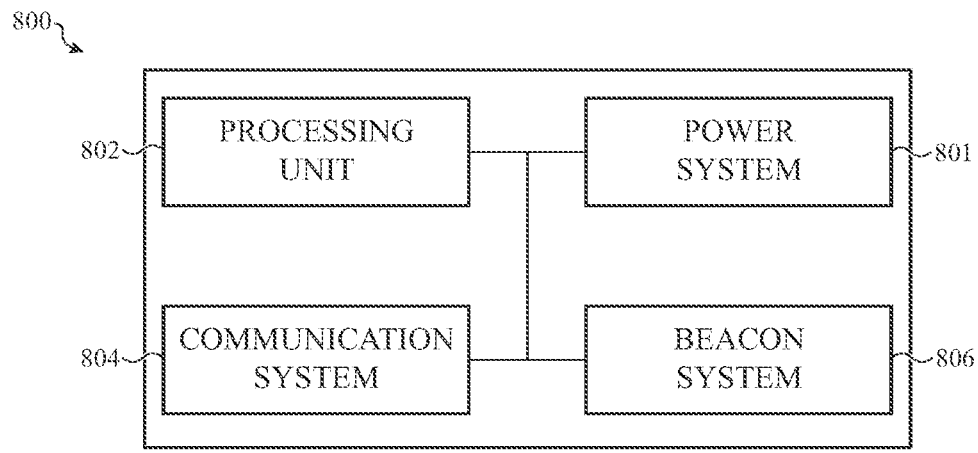
FIG. 8 illustrates example components of a wireless communication device.

FIG. 8 depicts an example schematic diagram of a wireless communication device 800. By way of example, the device 800 of FIG. 8 may correspond to the wireless communication device 104 shown in FIG. 1 (or any other wireless communication device described herein). To the extent that multiple functionalities, operations, and structures are disclosed as being part of, incorporated into, or performed by the device 800, it should be understood that various embodiments may omit any or all such described functionalities, operations, and structures. Thus, different embodiments of the device 800 may have some, none, or all of the various capabilities, apparatuses, physical features, modes, and operating parameters discussed herein.

As shown in FIG. 8, a device 800 includes a processing unit 802 that may include one or more processors and memory units. The processing unit 802 may be configured to receive signals from various components and systems of the device 800, and provide control signals to such components and systems based on programs run on the processors.

The device 800 may also include a power system 801, which may include one or more batteries, charging components, power controllers, or other suitable components or systems for providing power to the device 800. As described herein, the power system 801 may communicate with or provide information to a beacon system, which may in turn determine how and when to operate a beacon system (including when to deactivate cellular or other radios or communications systems).

The device 800 may also include a communication system 804. The communication system 804 may include antennas, radios, controllers, signal processing components, or other suitable components or systems that facilitate communication with other devices. For example, the communication system 804 may include radios and associated antennas for communicating via multiple different wireless communication protocols. More particularly, the communication system 804 may include radios and antennas for cellular communications (e.g., using any suitable cellular technology or communications protocol, including but not limited to 2G, 3G, 4G, 5G, LTE, CDMA, TDMA, GSM, GPRS, and so forth). The communication system 804 may also include radios and antennas for other wireless protocols, such as WiFi (e.g., IEEE 802.11 protocols, including for example 2.4 GHz protocols, 5 GHz protocols, etc.), Bluetooth, and so forth.

The device 800 may also include a beacon system 806. The beacon system 806 may communicate with and optionally control aspects of the communication system 804 and the power system 801 to perform operations as described herein. For example, the beacon system 806 may monitor the state of charge of one or more batteries associated with the power system 801, and upon detecting certain conditions (e.g., state of charge thresholds, cellular connectivity), cease operation of some portions of the communication system 804 (e.g., cellular radios and antennas), and operate others (e.g., WiFi radios and antennas) in a beacon mode. In some cases, the beacon system 806 selects an available WiFi protocol or band that has the greatest range and/or ability to penetrate obstacles. For example, where both 2.4 GHz and 5 GHz radios and antennas are available, the beacon system 806 may choose to operate the beacon on the 2.4 GHz spectrum.

Figure 9:
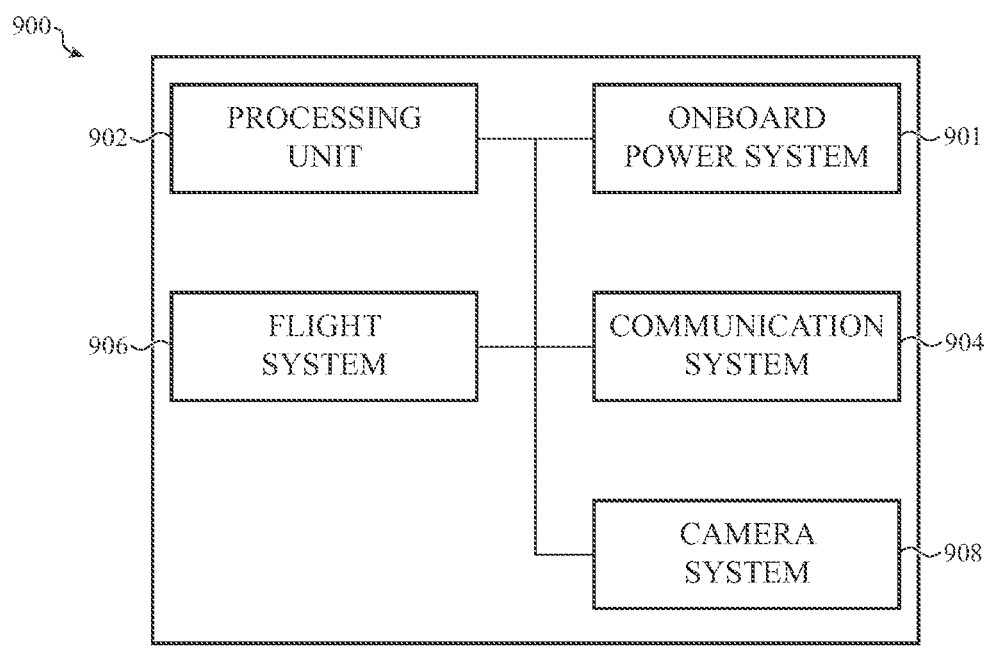
FIG. 9 illustrates example components of a UAV.

FIG. 9 depicts an example schematic diagram of a UAV 900. By way of example, the UAV 900 of FIG. 9 may correspond to the UAV 100 shown in FIG. 1 (or any other UAV described herein). To the extent that multiple functionalities, operations, and structures are disclosed as being part of, incorporated into, or performed by the UAV 900, it should be understood that various embodiments may omit any or all such described functionalities, operations, and structures. Thus, different embodiments of the UAV 900 may have some, none, or all of the various capabilities, apparatuses, physical features, modes, and operating parameters discussed herein.

As shown in FIG. 9, a UAV 900 includes a processing unit 902 that may include one or more processors and memory units. The processing unit 902 may be configured to receive signals from various components and systems of the UAV 900, and provide control signals to such components and systems based on programs run on the processors.

The UAV 900 may also include an onboard power system 901, which may include one or more batteries, charging components, power controllers, or other suitable components or systems for providing power to the UAV 900. As described herein, the onboard power system 901 may be configured to receive power from an air-to-ground tether, and charge the batteries of the onboard power system 901 and/or provide power directly from the air-to-ground tether to other components of the UAV 900, such as motors or other propulsion systems.

The UAV 900 may also include a communication system 904. The communication system 904 may include antennas, radios, controllers, signal processing components, or other suitable components or systems that facilitate communication with other devices. For example, the communication system 904 may include radios and associated antennas for communicating via multiple different wireless communication protocols. More particularly, the communication system 904 may include radios and antennas for cellular communications (e.g., using any suitable cellular technology or communications protocol, including but not limited to 2G, 3G, 4G, 5G, LTE, CDMA, TDMA, GSM, GPRS, and so forth). The communication system 904 may also include radios and antennas for other wireless protocols, such as WiFi (e.g., IEEE 802.11 protocols, including for example 2.4 GHz signals, 5 GHz signals), Bluetooth, and so forth. In some cases, the UAV 900 includes one or more directional antennas that may be utilized during a search operation to determine a direction between the UAV and a wireless communication device, as described above. In some cases, the UAV 900 also or instead includes a non-directional antenna. In some cases, the UAV 900 operates its non-directional antenna when monitoring a radio spectrum for a wireless communication signal, and operates its directional antenna after detecting the wireless communication signal to estimate the direction from the UAV 900 to the source of the wireless communication signal. In some cases the UAV 900 includes multiple directional antennas, which when operated in conjunction with one another provide wireless coverage similar to that of a non-directional antenna, while also providing direction-finding functionality using the same antennas (or a subset of the antennas).

The communication system 904 may also receive instructions from a remote operator (e.g., a human or computerized operator). Such instructions may include manual flight control instructions (e.g., from a remote control device), commands to initiate predetermined flight patterns or other flight or UAV control sequences (e.g., a launch and charge sequence, a flight pattern, a return-to-base sequence), or the like.

The UAV 900 may include a flight system 906 that controls flight operations of the UAV 900, and may include, control, or interface with flight hardware, such as motors, propellers, flight control surfaces, and the like. The flight system 906 may receive global positioning system (GPS) signals as part of controlling the flight operations of the UAV 900. The flight system 906 may receive control signals from the processing unit 902 to perform specific flight operations, such as launch or landing operations (FIGS. 2A-2C), flight patterns (e.g., FIGS. 4A-5B), location finding sequences (e.g., FIGS. 6A-6B).

The UAV 900 may include a camera system 908. The camera system 908 may include lenses, image sensors, light sources (e.g., flashes, flood lights, or other illumination components), or the like. The camera system 908 may capture video or still images (or both), and may capture images based on visible light, infrared light, or both.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wireless communication device, comprising:
a processor;
a wireless communication system comprising:
a cellular radio; and
a WiFi radio; and
a battery operable to power the wireless communication system and the processor;
wherein:
the processor is configured to:
determine at least one of: that the wireless communication system has not detected a cellular base station for a predetermined period of time, or that the battery has dropped below a predetermined charge level;
after making the determination:
cease operation of the cellular radio;
operate the wireless communication system to transmit, with the WiFi radio, a series of signals, each respective signal being transmitted for a respective predetermined duration at a respective predetermined time, the respective predetermined duration and the respective predetermined time synchronized with a set of predetermined lost user search times used by mobile search vehicles; and
between transmissions of the signals, cease operation of the WiFi radio.

2. The wireless communication device of claim 1, wherein:
the cellular radio communicates via a first frequency band; and
the WiFi radio communicates via a second frequency band that does not overlap with the first frequency band.

3. The wireless communication device of claim 1, wherein at least one signal of the series of signals comprises a signal set identifier (SSID).

4. The wireless communication device of claim 1, wherein at least one signal of the series of signals includes a unique device identifier associated with the wireless communication device.

5. The wireless communication device of claim 4, wherein:
the wireless communication device further comprises a positioning system; and
the at least one signal includes a location of the wireless communication device as reported by the positioning system.

6. The wireless communication device of claim 1, wherein the processor is further configured to operate the wireless communication system to transmit, after transmitting the series of signals, with the WiFi radio, and in response to a request from a remote unmanned aerial vehicle, a data broadcast.

7. The wireless communication device of claim 1, wherein the series of signals includes a health status of a user of the wireless communication device.

8. A method of operating a wireless communication device, comprising:
determining that a battery of the wireless communication device has dropped below a predetermined charge level;
at least partly in response to making the determination,
ceasing cellular communications of the wireless communication device;
operating the wireless communication system to transmit, using a WiFi radio of the wireless communication device, a series of signals, each respective signal being transmitted for a respective predetermined duration at a respective predetermined time, the respective predetermined duration and the respective predetermined time synchronized with a set of predetermined lost user search times used by mobile search vehicles; and
between transmissions of the signals, ceasing operation of the WiFi radio.

9. The method of claim 8, wherein at least one signal of the series of signals comprises a signal set identifier (SSID).

10. The method of claim 8, wherein at least one signal of the series of signals includes a unique device identifier associated with the wireless communication device.

11. The method of claim 10, further comprising:
determining a location of the wireless communication device using a positioning system of the wireless communications device; wherein,
the at least one signal includes the location of the wireless communication device.

12. The method of claim 8, further comprising:
transmitting, after transmitting the series of signals, using the WiFi radio, and in response to a request from a remote unmanned aerial vehicle, a data broadcast.

13. A method of operating a wireless communication device, comprising:
activating a beacon mode;
while in the beacon mode,
turning off a cellular radio of the wireless communication device;
transmitting a series of signals using a WiFi radio of the wireless communication device, each respective signal being transmitted for a respective predetermined duration at a respective predetermined time, the respective predetermined duration and the respective predetermined time synchronized with a set of predetermined lost user search times used by mobile search vehicles; and
between transmissions of the signals, ceasing operation of the WiFi radio.

14. The method of claim 13, further comprising:
determining a cellular signal strength has dropped below a threshold value; wherein,
the beacon mode is activated in response to determining the cellular signal strength has dropped below the threshold value.

15. The method of claim 13, further comprising:
attempting to communicate with a cellular base station using the cellular radio; and
determining a cellular base station has not been detected for a predetermined period of time; wherein,
the beacon mode is activated in response to determining the cellular base station has not been detected for the predetermined period of time.

16. The method of claim 13, further comprising:
determining a battery of the wireless communication device has dropped below a predetermined charge level; wherein, the beacon mode is activated in response to determining the battery has dropped below the predetermined charge level.

17. The method of claim 13, wherein the series of signals includes a health status of a user of the wireless communication device.

18. The method of claim 13, wherein the series of signals includes a name or identity of a user of the wireless communication device.

19. The method of claim 13, further comprising:
periodically activating a GPS system and acquiring a current location of the wireless communication device; wherein,
the series of signals includes the current location of the wireless communication device.

20. The method of claim 19, wherein:
the GPS system is activated before and after activating the beacon mode; and
after activating the beacon mode, the GPS system is activated less frequently than before activating the beacon mode.

\* \* \* \* \*